United States Patent [19]

Westphal

[11] 4,168,847
[45] Sep. 25, 1979

[54] TRAILER HITCH

[75] Inventor: Larry J. Westphal, Gatesville, Tex.

[73] Assignees: Thomas R. Williams; William V. Healey, both of Gatesville, Tex.

[21] Appl. No.: 887,808

[22] Filed: Mar. 17, 1978

[51] Int. Cl.² .............................................. B62D 53/12
[52] U.S. Cl. ................................. 280/423 R; 280/477
[58] Field of Search ........... 280/423 R, 423 B, 478 R, 280/477, 504, 507, 512, 511

[56] References Cited

U.S. PATENT DOCUMENTS

| 2,628,106 | 2/1953 | Sturwold | 280/423 R |
| 3,433,503 | 3/1969 | Davis | 280/512 |
| 3,733,089 | 5/1973 | Goecke | 280/423 R |
| 3,815,936 | 6/1974 | Oaks | 280/415 A |
| 3,918,744 | 11/1975 | Gay | 280/415 B |

Primary Examiner—Joseph F. Peters, Jr.
Assistant Examiner—R. Schrecengost
Attorney, Agent, or Firm—Schuyler, Birch, Swindler, McKie & Beckett

[57] ABSTRACT

A gooseneck trailer hitch to couple a trailer torque to a towing ball mounted on a towing vehicle to be used in pulling a trailer has a tow member which is to be secured to the trailer tongue to extend generally horizontally forward of the trailer. This tow member has at its outer end a connector which pivotally mounts an arm for the arm to be swingable from an outwardly extending position into a vertical position with the outer end of such arm having a socket suitable to cooperate with the towing ball on the vehicle used to pull the trailer and locking means is provided to retain the arm in its vertical position. A jack stand is utilized adjacent the forward end of the trailer and tow member to hold the trailer and tow member generally horizontal incident coupling and uncoupling the trailer relative to the towing vehicle.

6 Claims, 5 Drawing Figures

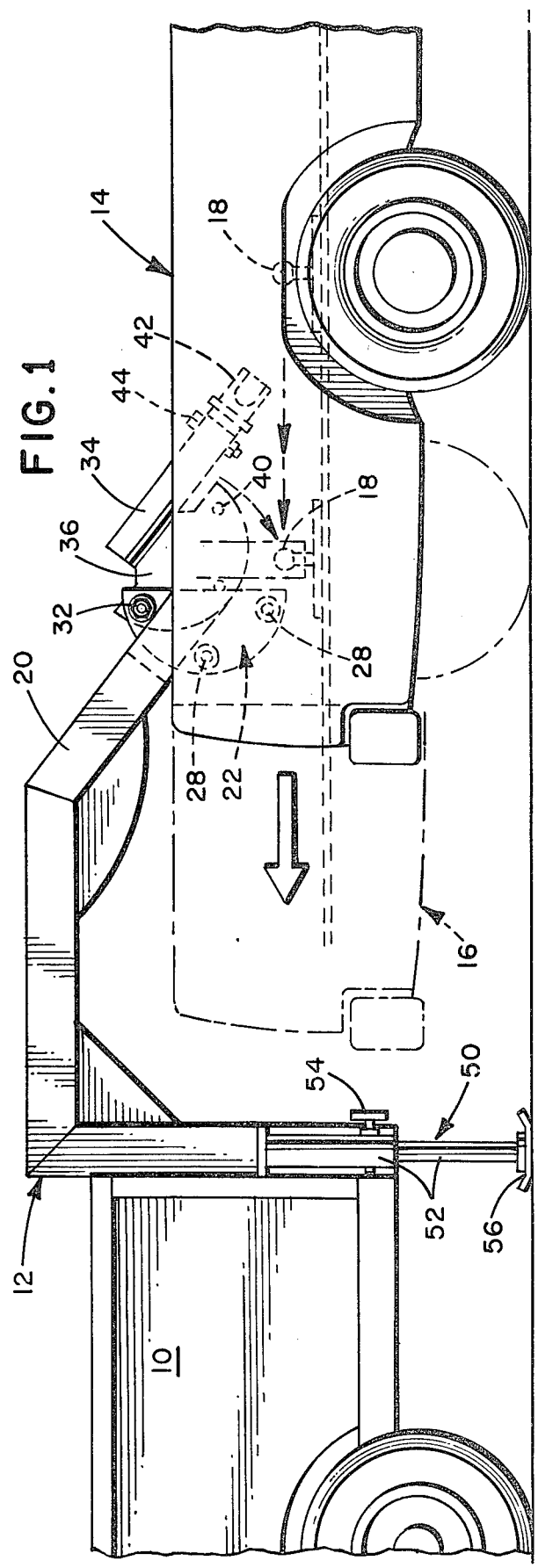
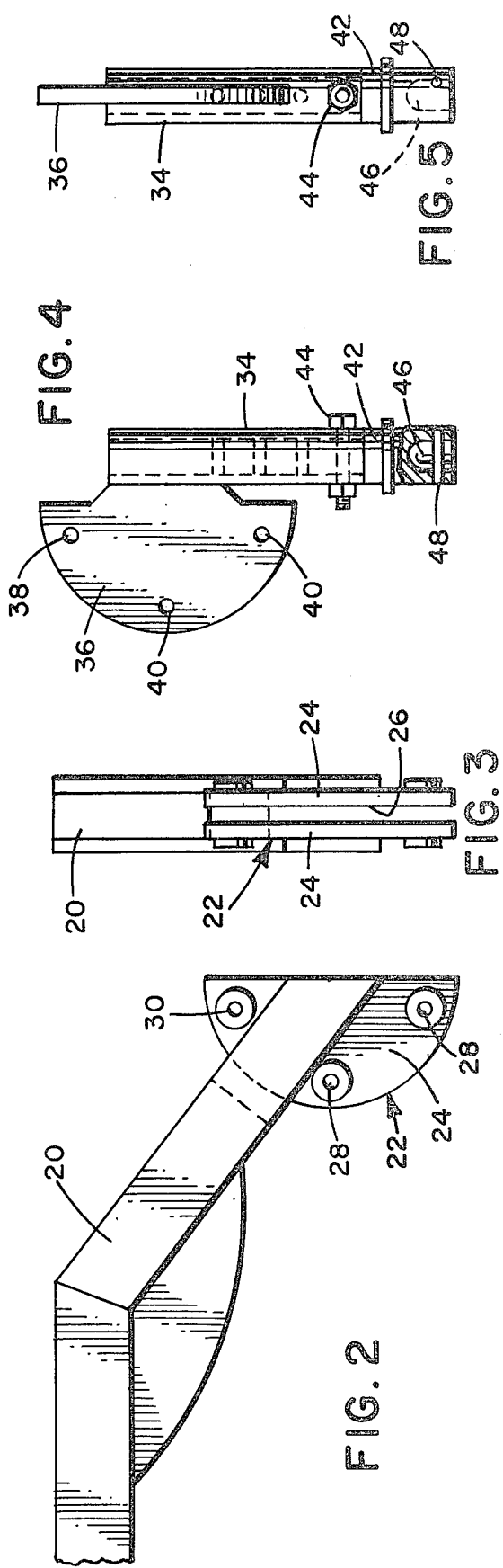

TRAILER HITCH

BACKGROUND OF THE INVENTION

This invention relates to trailer hitches and more specifically to a so called gooseneck trailer hitch.

Conventionally, gooseneck trailer tongues consist of a ridged L shaped connector with a socket or cavity at the end of the vertical section of the tongue which receives the trailer hitch ball mounted on the vehicle which is to tow the trailer. The towing ball is customarily mounted in the approximate center of the bed of the truck over the rear axle. The vertical member of the tongue with the socket or cavity at its end is ridgely and permanently affixed to the horizontal member of the tongue which in turn is attached to the trailer.

The above described conventional gooseneck tongue has several problems. The trailer can be easily stolen by anyone who happens to have a properly sized towing ball on their truck. The thief simply backs up under the gooseneck, attaches the socket to his towing ball and drives off.

Also conventional gooseneck trailers must be equipped with a jack, usually a hydraulic jack so that the socket can be lowered onto or raised off of a trailer hitch towing ball. The conventional proceedure is to raise the hitch by means of a hydraulic jack, back up the towing vehicle to place the towing ball directly below and in alignment with the socket and then lower the gooseneck vertically onto the towing ball. The uncoupling involves the reverse of these steps.

Additionally, coupling with a conventional gooseneck trailer hitch is difficult and inconvenient for one person to accomplish. Two people are usually required, one to position the towing vehicle and the other to raise or lower the socket into the towing ball when alignment is achieved.

SUMMARY OF THE INVENTION

The instant gooseneck trailer hitch invention has a tow member that is generally welded to the trailer tongue so as to extend horizontally forward of the truck. It provides at its outer end a connector which pivotally mounts an arm so the arm can swing from an outwardly extending position into a vertical position. The outer end of the arm has a socket formed by a cavity which cooperates with the towing ball on the vehicle when this arm is in the vertical position. Locking means is provided to retain the arm in such position.

A simple jack stand rather than a hydraulic lift can be utilized under the forward end of the trailer to hold the trailer horizontal during coupling or uncoupling to the towing vehicle.

With the foregoing in mind it is an object of the present invention to provide a gooseneck hitch having a swingable outer end arm which greatly facilitates coupling the hitch to the towing ball by merely backing the towing vehicle under the swingable arm to couple or uncouple by moving the vehicle away after the swingable arm has been released from the arm locking means which was engaged while the trailer was being towed.

Another object of the invention is to have the above mentioned swingable arm conveniently separable since once it is removed the possibility of trailer theft for all practical purposes is eliminated.

It is a further object of the invention to have a gooseneck hitch not requiring the usual hydraulic jack or other extensible lifting means to carry out coupling and uncoupling operations and where a simple jack stand may be used.

Further an object of the invention is to provision of a gooseneck hitch wherein one person can more easily perform coupling and uncoupling than with the conventional gooseneck trailer hitch.

BRIEF DESCRIPTION OF THE DRAWINGS

FIG. 1 is a side elevational view showing the gooseneck hitch in relation to a towing vehicle in the process of coupling.

FIG. 2 is a side elevation of a portion of the tow member that is connected to the trailer with the pivotal mounting connector on the end of the member.

FIG. 3 is an end elevation of the structure of FIG. 2.

FIG. 4 is a side elevation with a portion in section showing the arm which is pivotally connected to the tow member shown in FIGS. 2 and 3.

FIG. 5 is an end elevation of the arm shown in FIG. 4.

DESCRIPTION OF A PREFERRED EMBODIMENT

Referring to FIG. 1, a conventional trailer 10 is shown with the gooseneck hitch 12 of the invention secured to the forward end of trailer 10. A portion of an appropriate towing vehicle 14 is shown in position to back into the hitch 12 in carrying out a coupling operation. The phantom line 16 shows the position of the rear of the truck when it has backed under the hitch 12 to be fully coupled. The towing ball 18 is shown in its fixed position mounted on the open bed of the truck.

The gooseneck hitch 12 is made up of two separable components which are pivotally connected together to carry out the coupling and uncoupling as will be described. One component is made up of a tow member 20 a portion of this member is shown in FIG. 2. The member is secured to the tongue or forward end of trailer 10 and extends outwardly and then downwardly toward the vehicle that is to perform the towing. The outer end of tow member 20 carries a connector 22.

In the embodiment illustrated, connector 22 is made up of a pair of semi-circular plates 24 which are appropriately welded to the end of the tow member 20. They are held in spaced apart relation to provide a pocket 26 between the two plates. Two holes 28 in each of plates 24 are formed to be aligned so that pins or bolts (not shown) may be passed through the aligned pairs of holes 28 to form a locking means as will be explained. A third hole 30 is formed in each of the plates 24 lined up so that a pivot pin may extend through the two plates and across the pocket 26 therebetween. Referring to FIG. 1 it will be seen that the pivot pin extending through holes 30 across pocket 26 may conveniently be provided by a nut and bolt connector 32 or other fastening means such as a snap or spring loaded pin. Although a permanent stub shaft could be employed or other pivoting pin means used, the bolt and nut connector 32 has the added advantage that it readily enables detachment of the outer pivoting arm to provide the hereinabove mentioned safety against theft by taking the arm off so that the gooseneck hitch will be only partly present and cannot simply be connected to a towing ball on a vehicle attempting to steal the trailer.

An arm 34 is pivotally connected to the tow member 20 by the connector 22. This pivotal connection is provided by the bolt and nut connector 32. The arm 34 and its mounting plate 36 are shown in detail in FIGS. 4 and 5. The mounting plate 36 nests in the pocket 26 between plates 24 of the connector 22 carried by tow member 20. The mounting plate 36 has a hole 38 for pivotally mounting the arm on tow member 20. The mounting plate 36 is inserted in pocket 26 with a nut and bolt connector 32 not in place. Once the hole 38 is aligned with the holes 30 in plates 24, the nut and bolt connector 32 will be inserted, leaving the arm 34 pivotally connected to tow member 20 to be swingable from an outward position into a generally vertical position. Mounting plate 36 also has two spaced holes 40. These are located so that when arm 34 swings down to a vertical position holes 40 will align with the pairs of holes 28 in the two plates 24. In this position bolt and nut connectors may be inserted to lock the arm 34 in the vertical position relative to the rest of the gooseneck hitch.

A socket member 42 is retained on the end of arm 34 by bolt and nut connector 44. Member 42 provides a socket or cavity 46 as shown on FIGS. 4 and 5, which the towing ball 18 on the vehicle enters during coupling and is withdrawn from during uncoupling. A retaining pin 48 may be provided extending along the inner edge of cavity 46. This pin is not in place during coupling or uncoupling but can be inserted in the coupling member 42 once the ball is in cavity 46. The ball diameter is such that it cannot move out of the cavity with pin 48 in place and the hitch is firmly held together.

A simple jack stand 50 is affixed to the front of the trailer 10 and tow member 20 which is made up of telescoping members 52. It may be provided with a set screw 54 to hold the telescoping members 52 at the desired fixed length to support the trailer weight when not in use. As will be explained, incident coupling to the ball 18, the gooseneck hitch and the trailer are automatically elevated as the coupling operation proceeds. Jack stand 50 may appropriately have a foot 56 fixed to the lower end of the lower telescoping member 52.

Referring to the coupling action, the hitch 12 is shown in readiness for coupling. The arm 34 is extending outwardly and as the vehicle 14 backs to its phantom line position 16 the ball 18 enters the cavity 46 when it reaches the cavity on the backing movement shown in FIG. 1. Since the arm is mounted to pivot about connector 32 the rearward movement of vehicle 14 though the engagement of ball 18 and cavity 46 swings the arm 34 downwardly towards the vertical position. In so doing the arm 34 raises the forward end of the hitch as well as the front end of the trailer, lifting jack stand 50 out of engagement with the ground.

When the vehicle moves back far enough arm 34 will have swung to its vertical position and the ball 18 will be fully located within the cavity 46. At this point holes 40 on mounting plate 36 of the arm 34 will be aligned with the pairs of holes 28 in the two plates 24 of connector 22. The bolt and nut connectors (not shown) can be assembled through the holes to lock the arm 34 in its vertical position. The coupling is completed and the vehicle 14 may tow trailer 10 away. Uncoupling is equally as simple to accomplish. The locking pins are removed from the pairs of aligned holes 28 and 40. This frees arm 34 to swing outwardly on pivot connector 32. The towing vehicle 14 is merely driven forward. Arm 34 swings out to the position shown in FIG. 1 and towing ball 18 disengages from socket or cavity 46 in the arm 34. During this movement the swinging action of arm 34 about pivot connector 32 lowers the hitch 12 and forward end of the trailer 10 with jack stand 50 taking over its load supporting duty as foot 56 on the jack stand moves down into engagement with the ground. The towing vehicle simply need be driven away leaving the trailer fully supported by the jack stand 50.

If the protection against theft of the trailer by someone else having a towing vehicle with an appropriate towing ball 18 thereon is now desired, arm 32 may simply be removed by unbolting connector 32. The rightful owner of the trailer may retain the arm until he again desires to move the trailer whereupon the arm 34 need merely be remounted on pivot connector 32 for the hitch 12 to again be complete and ready for use.

The foregoing sets forth a detailed description of the gooseneck trailer hitch of the invention. The description has given only one preferred embodiment and it is to be recognized that various modifications of the invention may occur to those skilled in the art. Therefore the scope of the invention is to be limited only by the scope of the appended claims.

I claim:

1. A gooseneck trailer hitch to couple a trailer tongue to a towing ball mounted on a towing vehicle for the trailer comprising:
   a tow member to be secured to the trailer tongue to extend forward of the trailer,
   connector means providing a pivotal mounting carried adjacent the outer end of said tow member as an integral part of said member,
   an arm pivotally mounted on said pivotal mounting, to be swingable from an outwardly extending position into a generally vertical position, said arm having semispherical socket means to slidingly and rotatably cooperate with the towing ball on the towing vehicle incident relative movement between the towing vehicle and the trailer to couple the trailer to the vehicle wherein the trailer is lifted from a rest position incident such coupling, and
   locking means associated with said connector means and said arm to be engageable to retain said arm in said generally vertical position relative to said tow member.

2. A gooseneck trailer hitch as recited in claim 1 wherein said tow member extends generally horizontally and then downwardly in front of the trailer with said connector means being carried at the outer end of the downwardly extending portion.

3. A gooseneck trailer hitch as recited in claim 1 wherein said socket means is in the form of a cavity in the free end of said arm to accommodate the towing ball and a retaining pin is insertable in bores in the sides of said cavity to retain the towing ball in the cavity when the trailer is coupled to be towed.

4. A gooseneck trailer hitch to couple a trailer tongue to a towing ball mounted on a towing vehicle for the trailer comprising:
   a tow member to be secured to the trailer tongue to extend forward of the trailer,
   connector means carried adjacent the outer end of said tow member,
   an arm pivotally mounted on said connector means to be swingable from an outwardly extending position into a generally vertical position, said arm having socket means to cooperate with the towing ball on the towing vehicle, and
   locking means associated with said connector means and said arm to be engageable to retain said arm in said generally vertical position relative to said tow member, said locking means comprising at least one hole formed in each of said connector means and said arm, said holes being aligned when said arm is disposed in its generally vertical position, and pin means is provided to engage in said holes when they are aligned.

5. A gooseneck trailer hitch to couple a trailer tongue to a towing ball mounted on a towing vehicle for the trailer comprising:
- a tow member to be secured to the trailer tongue to extend forward of the trailer,
- connector means carried adjacent the outer end of said tow member made up by a pair of spaced plates secured to the end of said tow member,
- an arm pivotally mounted on said connector means to be swingable from an outwardly extending position into a generally vertical position, said arm having socket means to cooperate with a towing ball on the towing vehicle, said arm carrying a mounting plate which nests between said spaced plates,
- pivot pin means extending through aligned holes in the three plates to pivotally mount said mounting plate to enable swinging movement of said mounting plate relative to said spaced plates, and
- locking means associated with said connector means and said arm to be engagable to retain said arm in said generally vertical position relative to said tow member.

6. A gooseneck trailer hitch as recited in claim 5 wherein said pivot pin means is provided by a bolt and nut connector and said locking means is provided by a pair of spaced bolt and nut connectors passing through bores in the three plates, said holes being aligned when said arm is in said generally vertical position.

* * * * *